US012719672B2

United States Patent

(12) United States Patent
van Vredendaal et al.

(10) Patent No.: US 12,719,672 B2
(45) Date of Patent: Aug. 25, 2026

(54) KEY DERIVATION METHODS FOR HASH-BASED SIGNATURE SCHEMES

(71) Applicant: NXP B.V., Eindhoven (NL)

(72) Inventors: Christine van Vredendaal, Veldhoven (NL); Melissa Azouaoui, Norderstedt (DE); Marcel Medwed, Graz (AT); Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 198 days.

(21) Appl. No.: 18/319,982

(22) Filed: May 18, 2023

(65) Prior Publication Data

US 2024/0388429 A1 Nov. 21, 2024

(51) Int. Cl.
*H04L 9/08* (2006.01)
*H04L 9/32* (2006.01)

(52) U.S. Cl.
CPC .......... *H04L 9/0869* (2013.01); *H04L 9/3242* (2013.01); *H04L 9/3247* (2013.01)

(58) Field of Classification Search
CPC .... H04L 9/0869; H04L 9/3242; H04L 9/3247
See application file for complete search history.

(56) References Cited

U.S. PATENT DOCUMENTS 9,935,770 B1 * 4/2018 Juels .......................... H04L 1/00
2018/0091309 A1 * 3/2018 Misoczki .............. H04L 9/3242
2018/0212779 A1 * 7/2018 Bergmann ............ H04L 9/3247
2019/0319803 A1 10/2019 Misoczki et al.
2019/0364042 A1 * 11/2019 Liu ..................... H04W 12/069
2022/0100873 A1 * 3/2022 Yoon ..................... G06F 21/575
2024/0031127 A1 * 1/2024 Basso ..................... H04L 9/002
2024/0356736 A1 * 10/2024 Relyea .................. H04L 9/3236

FOREIGN PATENT DOCUMENTS

EP 2378707 A1 10/2011
EP 4033696 A1 7/2022

OTHER PUBLICATIONS

Yin, Xinming et al.; "An Efficient Two-Factor Authentication Scheme Based on the Merkle Tree"; MDPI Sensors 2020; Published Oct. 9, 2020; https://doi.org/10.3390/s20205735.
Andreas Huelsing and Johannes Buchmann, On the security of the winternitz onetime signature scheme, https: / /huelsing. net/wordpress/ wp-content/uploads/2015/03/part-0607.pdf.

(Continued)

Primary Examiner — Darshan I Dhruv

(57) ABSTRACT

A data processing system comprising instructions embodied in a non-transitory computer readable medium, the instructions for generating keys in a hash based signature system in a processor, the instructions, including: generating, by a random number generator, a seed; repeatedly hashing the seed with a first hash function to produce n/k chained seeds, wherein n is a total number secret keys generated and k is a number of secret keys generated from each chained seed; and generating k secret keys from each of the n/k chained seeds using a second hash function, wherein at least one of the k secret keys is generated from another of the k secret keys in a sequential chain.

19 Claims, 9 Drawing Sheets

(56) References Cited

OTHER PUBLICATIONS

Jean-Philippe Aumasson, Daniel J. Bernstein, Ward Beullens, Christoph Dobraunig, Maria Eichlseder, Scott Fluhrer, Stefan-Lukas Gazdag, Andreas Hulsing, Panos Kampanakis, Stefan Kolbl, Tanja Lange, Martin M. Lauridsen, Florian Mendel, Ruben Niederhagen, Christian Rechberger, Joost Rijneveld, Peter Schwabe, and Bas Westerbaan, Sphincs+: Submission to the nist post-quantum project, v.3, (2020).
Johannes Buchmann, Erik Dahmen, and Michael Schneider, Merkle tree traversal revisited, In Proceedings of the 2nd International Workshop on Post-Quantum Cryptography, Pqcrypto '08, Springer-Verlag, 2008, pp. 63-78.
David Cooper, Daniel Apon, Quynh Dang, Michael Davidson, Morris Dworkin, and Carl Miller, Recommendation for stateful hash-based signature schemes, Oct. 29, 2020 00:10:00 2020.
Andreas Huelsing, Denis Butin, Stefan-Lukas Gazdag, Joost Rijneveld, and Aziz Mohaisen, XMSS: extended Merkle Signature Scheme, RFC 8391, May 2018.
Andreas Huelsing, W-OTS+—Shorter Signatures for Hash-Based Signature Schemes, Progress in Cryptology—Africacrypt 2013 (Amr Youssef, Abderrahmane Nitaj, and Aboul-Ella Hassanien, eds.), vol. 7918, 2013, pp. 173-188.
Andreas Huelsing, Joost Rijneveld, and Fang Song, Mitigating Multi-target Attacks in Hash-Based Signatures, PKC 2016 (Chen-Mou Cheng, Kai-Min Chung, Guiseppe Persiano, and Bo-Yin Yang, eds.), vol. 9614, 2016, pp. 387-416.
Markus Jakobsson, Tom Leighton, Silvio Micali, and Michael Szydlo, Fractal merkle tree representation and traversal, In Proc. of RSA Cryptographers' '!rack, Springer,2003, pp. 314-326.
David McGrew, Michael Curcio, and Scott Fluhrer, Leighton-Micali Hash-BasedSignatures, RFC 8554, Apr. 2019.
Marcel Medwed, Frangois-Xavier Standaert, Ventzislav Nikov, and Martin Feldhofer, Unknown-input attacks in the parallel setting: Improving the security of the CHES 2012 leakage-resilient PRF, Asiacrypt (1), Lecture Notes in Computer Science, vol. 10031, 2016, pp. 602-623.
Ralph C. Merkle, A Certified Digital Signature, Advances in Cryptology—Crypto (Gilles Brassard, ed.), vol. 435, Springer, 1989, pp. 218-238.

* cited by examiner

KEY DERIVATION METHODS FOR HASH-BASED SIGNATURE SCHEMES

FIELD OF THE DISCLOSURE

Various exemplary embodiments disclosed herein relate to key derivation methods with leakage-performance trade-offs for hash-based signature schemes.

BACKGROUND

Digital signatures are of vital importance to the cryptographic infrastructure. For example, digital signatures underpin the authentication infrastructure in the form of digital certificates on the internet, which is shifting more and more to resource-constrained devices on the Internet of Things (IoT). In order to make digital signatures accessible to such small devices, it is important to minimize the resource requirements and optimize the efficiency of the involved algorithms (e.g., key generation, signature generation and verification).

SUMMARY

A summary of various exemplary embodiments is presented below.

Various embodiments relate to a data processing system including instructions embodied in a non-transitory computer readable medium, the instructions for generating keys in a hash based signature system in a processor, the instructions, including: generating, by a random number generator, a seed; repeatedly hashing the seed with a first hash function to produce n/k chained seeds, wherein n is a total number of secret keys generated and k is a number of secret keys generated from each chained seed; and generating k secret keys from each of the n/k chained seeds using a second hash function, wherein at least one the k secret keys is generated from another of the k secret keys in a sequential chain.

Various embodiments are described, generating k secret keys includes generating the secret keys using a tree structure with r levels wherein $k=2^r$.

Various embodiments are described, generating k secret keys includes sequentially generating the secret keys in a chain using the second hash function.

Various embodiments are described, wherein a random value r is applied to indices used in computing one of the first hash function and the second hash function.

Various embodiments are described, wherein two different random values $r_1$ and $r_2$ are applied to the indices used in computing one of the first hash function and the second hash function.

Various embodiments are described, wherein the hash based signature system uses one of an extended Merkle Signature Scheme (XMSS), a Leighton-Micali Signature (LMS), and a Sphincs+ signature scheme.

Further various embodiments relate to a data processing system including instructions embodied in a non-transitory computer readable medium, the instructions for generating keys in a hash based signature system in a processor, the instructions, including: generating, by a random number generator, a seed; and repeatedly hashing the seed using a first hash function sequentially in a chain to produce a plurality of secret keys.

Various embodiments are described, further including: repeatedly hashing the seed sequentially with the first hash function to produce a plurality of chained seeds; and generating a plurality of secret keys sequentially in a chain for each of the plurality of chained seeds by repeatedly applying a second hash function to each of the plurality of chained seeds.

Various embodiments are described, wherein a random value r is applied to indices used in computing one of the first hash function.

Various embodiments are described, wherein two different random values $r_1$ and $r_2$ are applied to the indices used in computing one of the first hash function and the second hash function.

Various embodiments are described, wherein the hash based signature system uses one of an extended Merkle Signature Scheme (XMSS), a Leighton-Micali Signature (LMS), and a Sphincs+ signature scheme.

Further various embodiments relate to a data processing system including instructions embodied in a non-transitory computer readable medium, the instructions for generating keys in a hash based signature system in a processor, the instructions, including: generating, by a random number generator, a seed; generating a first random value $r_1$; and generating a first plurality of secret keys using a first hash function based upon the seed and by applying the first random value $r_1$ to at least one parameter input into the first hash function.

Various embodiments are described, generating a first plurality of secret keys includes: repeatedly hashing the seed sequentially with the first hash function to produce a plurality of chained seeds; and generating a plurality of secret keys for each of the plurality of chained seeds by repeatedly applying a second hash function to each of the plurality of chained seeds.

Various embodiments are described, wherein the plurality of secret keys is generated sequentially in a chain for each of the plurality of chained seeds by repeatedly applying a second hash function to each of the plurality of chained seeds.

Various embodiments are described, wherein the plurality of secret keys is generated in a tree structure for each of the plurality of chained seeds.

Various embodiments are described, wherein the hash based signature system uses one of an extended Merkle Signature Scheme (XMSS), a Leighton-Micali Signature (LMS)), and a Sphincs+ signature scheme.

Various embodiments are described, further including: generating a second random value $r_2$; and generating a second plurality of secret keys using the first hash function based upon the seed and by applying the second random value $r_2$ to at least one parameter input into the first hash function.

Various embodiments are described, generating a first and second plurality of secret keys includes: repeatedly hashing the seed sequentially with the first hash function to produce a plurality of chained seeds; and generating the first and second plurality of secret keys for each of the plurality of chained seeds by repeatedly applying the first hash function to each of the plurality of chained seeds.

Various embodiments are described, wherein the first plurality of secret keys is generated sequentially in a chain for each of the plurality of chained seeds by repeatedly applying the first hash function to each of the plurality of chained seeds, and the second plurality of secret keys are generated sequentially in a chain for each of the plurality of chained seeds by repeatedly applying the first hash function to each of the plurality of chained seeds.

Various embodiments are described, wherein the plurality of first and second secret keys are generated in a tree structure for each of the plurality of chained seeds.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
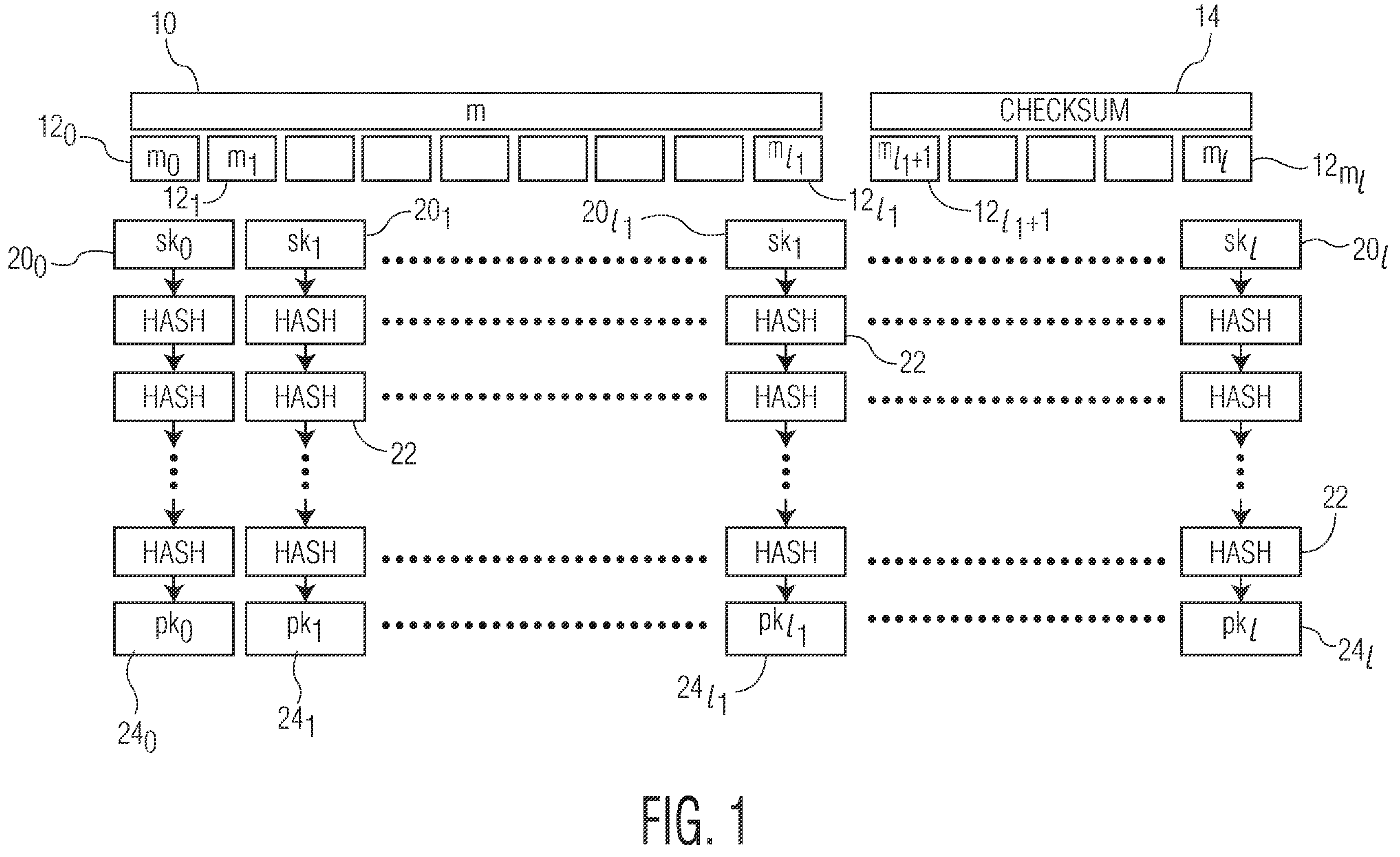
FIG. 1 illustrates the WOTS+ secret key and public key and how they are linked to the message digest and checksum.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of hash based digital signature systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Digital signatures are of vital importance to the cryptographic infrastructure. New standards related to two quantum-safe digital signature schemes extended Merkle Signature Scheme (XMSS) and Leighton-Micali Signature (LMS) have been published. These stateful hash-based schemes have in common that the secret key includes a seed, from which the signature-specific secret keys have to be derived. As this key derivation processes secret information, this key derivation process may be targeted by a side-channel attacker and might require dedicated protection measures. Although recommendations for derivation strategies exist (mostly focused on performance impact, rather than side-channel security), there is no standard method to perform this key derivation. In this disclosure, a new key derivation method is described that enables a trade-off between side-channel security of the key derivation and the performance of the signing operation. This helps to improve the efficiency of hardened implementations of such digital signature schemes.

The most commonly used signature schemes are Rivest-Shamir-Adleman (RSA) and variants of Elliptic Curve Digital Signature Algorithm (ECDSA) and Digital Signature Algorithm (DSA). However, with the possibility of a quantum computer being realized, the security of RSA, ECDSA, and DSA is threatened. The idea of hash-based signatures dates back to a proposal by Ralph Merkle (see Ralph C. Merkle, *A Certified Digital Signature*, Advances in Cryptology—CRYPTO (Gilles Brassard, ed.), vol. 435, Springer, 1989, pp. 218-238.) from the late 70s. Hash-based signatures rely on a graph structure in which nodes correspond to public keys of One-Time Signature (OTS) schemes, which are in turn constructed using hash functions. The security of this approach therefore relies on the cryptographic strength of the used hash function and the pseudo-random function family: cryptographic primitives which are well-studied, understood, and not known to be broken by quantum computers.

XMSS has matured since its original publication (see Andreas Hülsing, Joost Rijneveld, and Fang Song, Mitigating Multi-target Attacks in Hash-Based Signatures, PKC 2016 (Chen-Mou Cheng, Kai-Min Chung, Guiseppe Persiano, and Bo-Yin Yang, eds.), vol. 9614, 2016, pp. 387-416.), resulting in the scheme described in RFC 8391 (see Andreas Hülsing, Denise Butin, Stefan-Lukas Gazdag, Joost Rijneveld, and Aziz Mohaisen, *XMSS: Extended Hash-Based Signatures*. RFC 8391, 2018). RFC 3291 uses $WOTS^{+}$ as OTS, which are described herein in the context of XMSS (scc Andreas Hülsing, W-OTS+—*Shorter Signa-*

*tures for Hash-Based Signature Schemes*, Progress in Cryptology-AFRICACRYPT 2013 (Amr Youssef, Abderrahmane Nitaj, and Aboul-Ella Hassanien, eds.), vol. 7918, 2013, pp. 173-188). The security parameter n determines the message digest length m, and n influences the size of private key, public key, and signature. The Winternitz parameter w may be used to control a trade-off between speed and signature size. A greater value of w implies a smaller signature, but slower speeds and vice versa. Typically w is chosen as a power of 2 within {4,16,256}, as this allows for easy transformation of bit strings into base-w encoded strings. Further define:

$$\ell_1 = \left\lceil m \log_2(w) \right\rceil,\ \ell_2 = \left\lfloor \log_2(\ell_1(w-1)) \log_2(w) \right\rfloor + 1 \text{ and } \ell = \ell_1 + \ell_2.$$

An uncompressed WOTS$^+$ private key, public key, and signature includes $\ell$ blocks of n bits each. FIG. 1 illustrates the WOTS+ secret key and public key and how they are linked to the message digest and checksum. The message M is digested to produce an m-bit message digest 10. The message digest 10 is split into $\ell_1$ blocks $m_0 \ldots m_{\ell_1}$ $\mathbf{12}_0 \ldots 12_{\ell_1}$. A checksum 14 is performed on the message digest 10. The checksum 14 is split into $\ell - \ell_1$ blocks $m_{\ell_1+1} \ldots m_\ell$ $12_{\ell_1+1} \ldots 12_\ell$. The secret key sk includes $\ell$ blocks $sk_0 \ldots sk_\ell$ $\mathbf{20}_0 \ldots 20_\ell$. Each of the $\ell$ blocks $sk_0 \ldots sk_\ell$ $\mathbf{20}_0 \ldots 20_\ell$ are hashed 22 to produce secret key pk with $\ell$ blocks $pk_0 \ldots pk_\ell$ $\mathbf{24}_0 \ldots 24_\ell$.

An m-bit message digest of a message M, $H_M$ may be re-written to its base-w representation. The result is a length $\ell_1$ vector of integers $h_i \in [0, w-1]$. Each of these integers defines a chain length in the message (hash) chains (i.e., $m_0$ to $m_{\ell_1}$ in FIG. 1). The checksum of $H_M$ is defined as $C_M = \sum_{i=1}^{\ell_1} (w-1-h_i)$, which can be represented as a length $\ell_2$ vector of base-w values $C_M=(c_1, \ldots, c_{\ell_2})$, with $c_i \in [0, w-1]$ (i.e., $m_{\ell_1+1}$ to $m_\ell$ in FIG. 1). These hash chains are called the checksum (hash) chains. This checksum is necessary to prevent message forgery: an increase in at least one $h_i$ leads to a decrease in at least one $c_i$ and vice-versa. Using these $\ell$ integers as chain lengths, the function $\mathcal{H}$ is applied to the private key elements. This leads to $\ell$ n-byte values that make up the signature. For a received message and signature, the verifier may recompute the checksum, derive the chain lengths, apply $\mathcal{H}$ iteratively to complete each chain to its full length w, and compute a candidate WOTS$^+$ public key. This can then be compared to the n-byte public key.

Because a WOTS$^+$ signature may only be used once, XMSS combines WOTS$^+$ key pairs into a Merkle tree structure. A Merkle tree is a binary-tree-graph structure in which leaf-nodes (the lowermost layer) correspond to public keys of WOTS$^+$, which are in turn constructed using hash functions.

Figure 2:
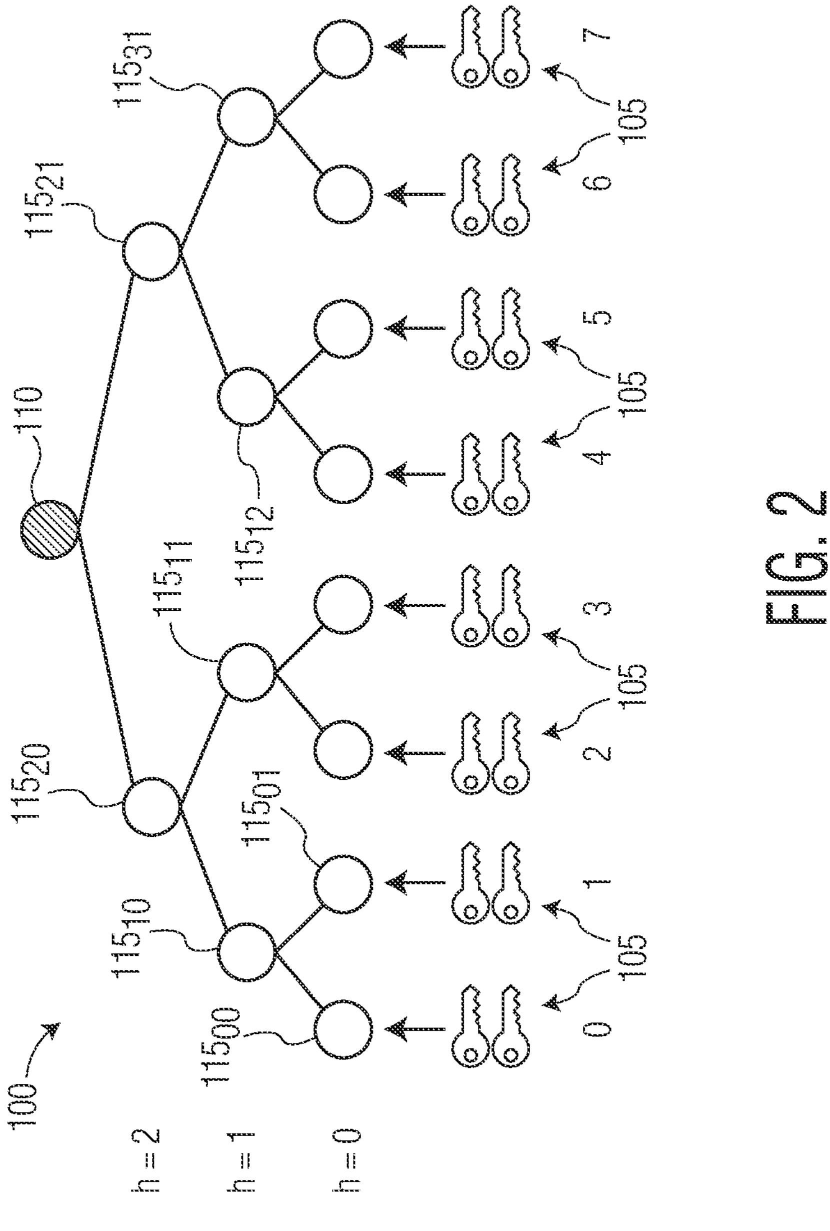
FIG. 2 illustrates a tree corresponding to 8 OTS public-private key pairs.

FIG. 2 illustrates a tree 100 corresponding to 8 OTS public-private key pairs. The tree 100 may be a binary-hash-tree such as a Merkle tree. In a high level description, the nodes $\mathbf{115}_{xx}$ of this tree 100 include n-bit hash values. The lowest layer (i.e., for h=0 the leaves of the tree $\mathbf{115}_{0x}$) includes the hashed OTS public keys of the OTS keypairs $\mathbf{105}_x$. The public key of the Merkle-tree scheme is then the root node 110 of the tree 100, which is constructed by taking pair-wise hashes of tree nodes 105, starting from the leaves, until 1 node remains at height h=3 (the node 110 in FIG. 2).

When signing a message, the signer signs with a (previously unused) OTS keypair 105, and sends the OTS signature of their message, along with the corresponding authentication path to the verifier. This authentication path allows a verifier to verify an OTS signature against the public key of the Merkle-tree-based scheme instead of against the OTS public key.

Figure 3:
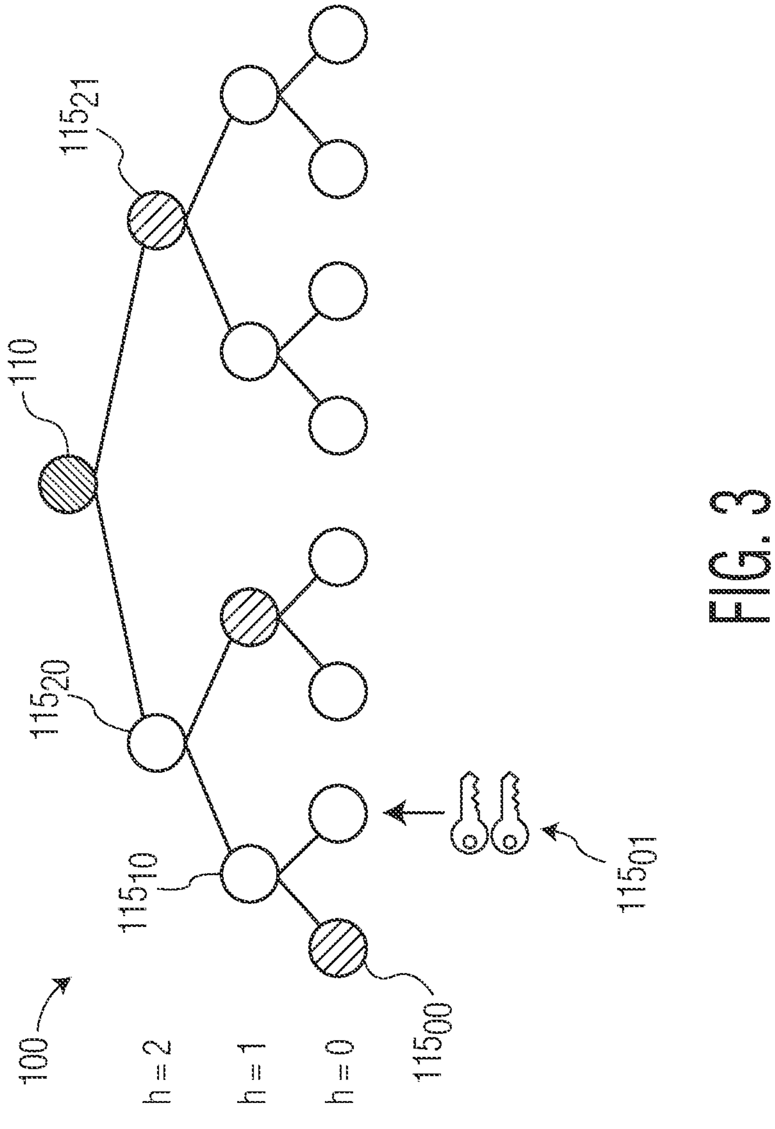
FIG. 3 illustrates an example for the authentication path of the second OTS keypair.

FIG. 3 illustrates an example for the authentication path of the second OTS keypair $\mathbf{105}_1$. The authentication path includes nodes $\mathbf{115}_{00}$, $\mathbf{115}_{11}$, and $\mathbf{115}_{21}$. Given the signature, the verifier may then compute the candidate root key as follows. First, they compute the OTS public key (PK) from the OTS signature and apply a hash to construct the corresponding Merkle tree leaf. Then they can apply in order a pairwise hash with the elements of the provided authentication path including nodes $\mathbf{115}_{00}$, $\mathbf{115}_{11}$, and $\mathbf{115}_{21}$. If the result matched the public key at node 110, the signature is verified.

Given the signature, the verifier can then compute the candidate root key with the provided WOTS+ signature and the authentication path. Strategies for the signer on how and when the authentication path should be computed vary but are not that important for this embodiment. What should be noted is that: 1) the computation of the authentication path involves the computation of WOTS+ public keys, and therefore of WOTS+ chains; and 2) the authentication path can be computed independently from the current WOTS+ signature.

Note that with XMSS, LMS is the second stateful hash-based algorithm that has been standardized. It functions the same as XMSS in the broad lines described here but makes some different low-level design decisions. The embodiments described herein apply to it as well, but for ease of describing the embodiments, XMSS will be used in the description.

Figure 4A:
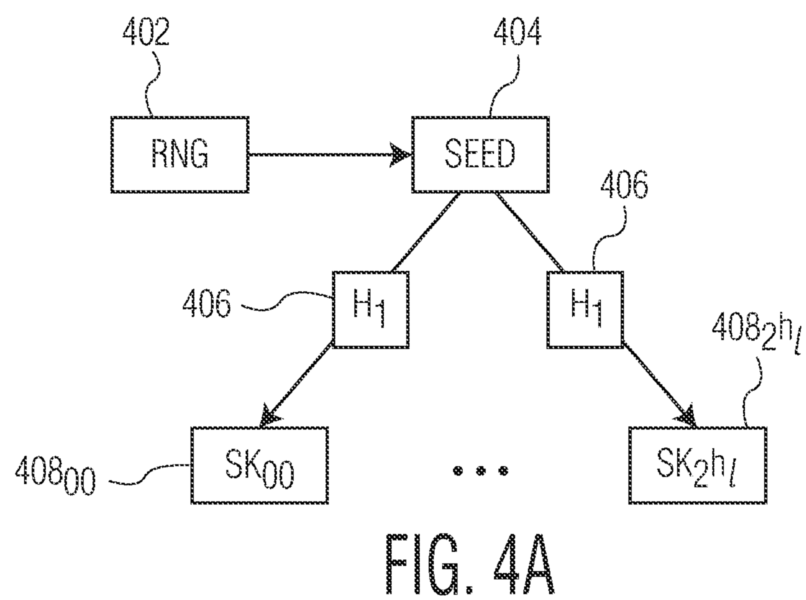
FIGS. 4A and 4B illustrate instantiations for generating an LMS and XMSS secret keys respectively.
Figure 4B:
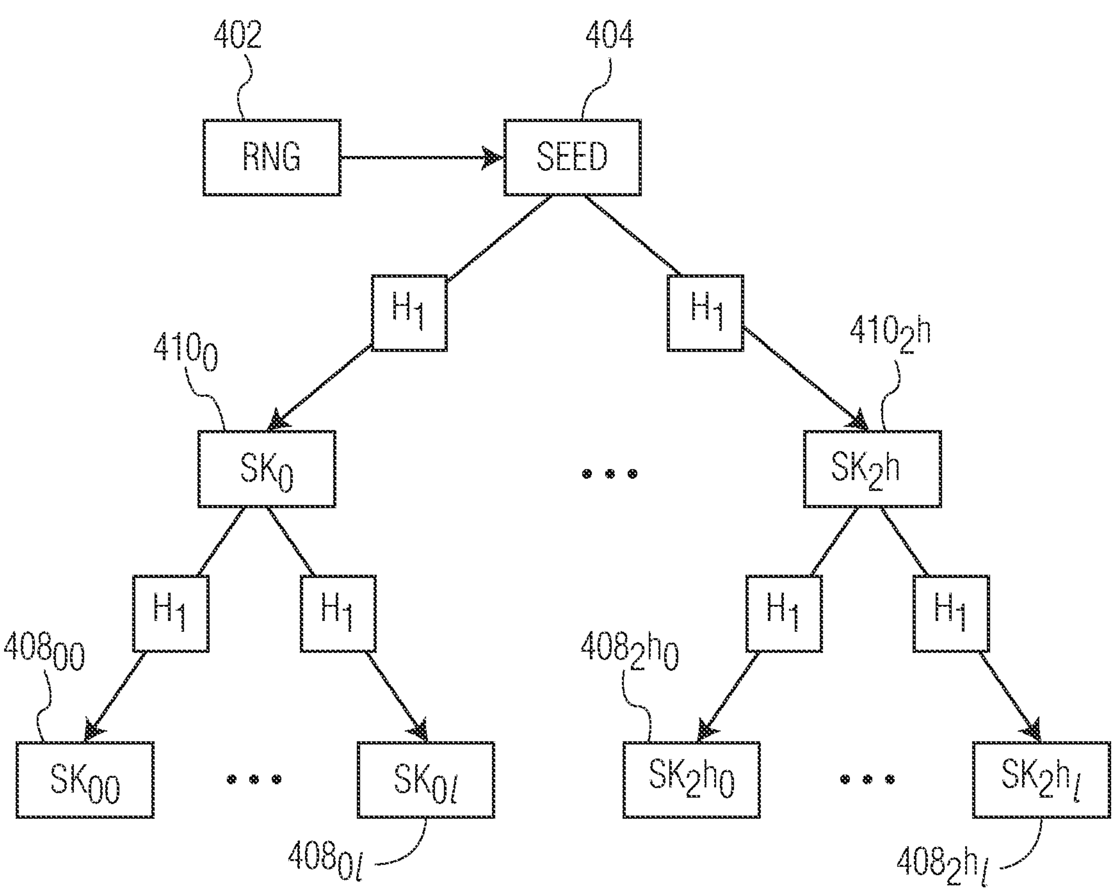

In both XMSS and LMS, the secret keys at the base of the WOTS$^+$ chains include $2^h \cdot \ell \cdot$n bytes. For common parameters this would amount to $2^{23}$ bytes easily, which is not feasible to store on an embedded device. Instead, schemes have been described that use pseudo-random options for their generation. The XMSS/LMS secret key is denoted here as SEED, each WOTS$^+$ secret key $SK_{WOTS^+}$ may be derived by applying a Pseudo Random Function (PRF) to SEED and the indexing information of WOTS$^+$ signature or even the WOTS$^+$ chain index of a signature. FIGS. 4A and 4B illustrate instantiations for generating an LMS and XMSS secret keys respectively. For LMS a random number generator (RNG) 404 generates the SEED 404. A hash function $H_1$ 406 is applied to the SEED 404 to produce $SK_{00} \ldots SK_{2^h \ell}$ key chain $\mathbf{408}_{00} \ldots 408_{2^h \ell}$. For XMSS a random number generator (RNG) 404 generates the SEED 404. The hash function $H_1$ 406 is applied to the SEED 404 to produce $SK_0 \ldots SK_{2^h}$ OTS key $\mathbf{410}_0 \ldots \mathbf{410}_{2^h}$. The hash function $H_1$ is further applied to the $SK_0 \ldots SK_{2^h_v}$ OTS key $\mathbf{410}_0 \ldots \mathbf{410}_{2^h}$ to produce $SK_{00} \ldots SK_{2^h \ell}$ key chain $\mathbf{408}_{00} \ldots 408_{2^h \ell}$.

Even though this is a fast and compact method of deriving the keys, for side-channel protection this is not a very convenient method. With this method, the secret key seed SEED is processed by the PRF function multiple times with varying (known) input for every signature. This gives a side-channel attacker many distinct side-channel observations to extract the secret secd SEED.

An alternative was presented by Hülsing (Andreas Hülsing and Johannes Buchmann, On the security of the winternitz onetime signature scheme, https://huelsing.net/wordpress/wp-content/uploads/2015/03/part-0607.pdf). Instead of applying the PRF to the same input every time, they proposed a chain of seeds for the $SK_{WOTS^+}$ values. The goal here was to provide forward secrecy; when one key leaks, nothing can be derived about the previous keys.

This works well for creating one WOTS+ signature and is much better from a side-channel protection perspective. Because each secret value is iteratively replaced by the next, it is much harder for an attack to combine trace information into recovering the secret key.

However, this comes with a major impact on the performance of XMSS and LMS as a whole. Unless the storage capability is there to store the entire Merkle tree of possible authentication paths (generally it is not), the nodes of the authentication paths have to be computed on-the-fly. If a message is being signed with key $SK_i$, then computing the authentication path involves computing $SK_j$ and $PK_j$ for all j with j≠i. This in turn implies having to repeatedly compute the chain of seeds for the $SK_{WOTS^+}$ values.

Although by the construction of the authentication paths and assuming minor storage, it is likely not necessary to backtrack from the current position in the chain, but this does come with the following disadvantages. The Side-Channel Analysis (SCA) security goes down, because repeatedly computing the chain means an attacker has access to multiple traces of the same secret value. It is a bit less concerning than in the previous case since the traces are on exactly the same value being processed (allowing only weaker Simple Power Analysis (SPA)), whereas previously some variation in the index was present every time (allowing stronger Differential Power Analysis (DPA)). However, the derivation of the secret keys $SK_{ij}$ is still based on the approach described by Huelsing, i.e., hash the same key seed multiple times with an index value which is known by an attacker. This index value varies (is incremented) at each signature making DPA attacks possible. The performance goes down, if the needed authentication node involves the computation of a $PK_j$ for j>>i, and up to $2^h$ extra hashes are required for a signature. Further, this approach is particularly sensitive to fault attacks with the aim of Denial-of-Service, because there is a single point of failure in the chain elements. All in all, both approaches have advantages and disadvantages for embedded implementations.

Key derivation embodiments will be disclosed herein that scales between the two approaches and therefore can give the advantages of both while limiting the degree of the disadvantages. The key derivation embodiments include: constructing a flexible tree-like structure for the OTS key derivation to increase performance and reduce leakage while maintaining some forward-secrecy type property; using chaining in the derivation of the chain values $S_{i,j}$ to increase the SCA resistance; and applying a blinding to the input of the key derivation function $H_i$ to increase SCA resistance.

The original scheme description of LMS uses a key derivation function (using a simplified notation; see also FIG. 4A) as $$SK_{q,i} = H(I \| q \| i \| const \| \mathrm{SEED}),$$

where I is a scheme identifier, const is a constant. A secret key at the top of a chain in FIG. 1 is derived by a PRF/hash function over the signature and chain index directly. This means there is no forward secrecy, and the secret key SEED is processed $\ell \cdot 2^h$ times giving an SCA attacker up to that number of distinct traces to recover the secret seed. On the plus side, getting a secret key element $SK_{q,i}$ only requires 1 hash, thus requiring $\ell$ hashes for $SK_q$.

XMSS uses a key derivation function (using a simplified notation; see also FIG. 4B) as $$\mathrm{SEED}_q = PRF(\mathrm{SEED}, toByte(q, 32)),$$

$$SK_{q,i} = PRF(\mathrm{SEED}_q, toByte(i, 32)).$$

A secret key at the top of a chain in FIG. 4B is derived by a PRF/hash function over the signature and chain index in sequence. This means there is still no forward secrecy, but the secret key SEED is processed only $2^h$ times giving an SCA attacker up to that number of traces to recover the secret key. This is traded off with requiring 2 hashes instead of 1 hash for a secret key element $K_{q,i}$, and thus requiring $\ell+1$ hashes for $SK_q$.

Figure 5:
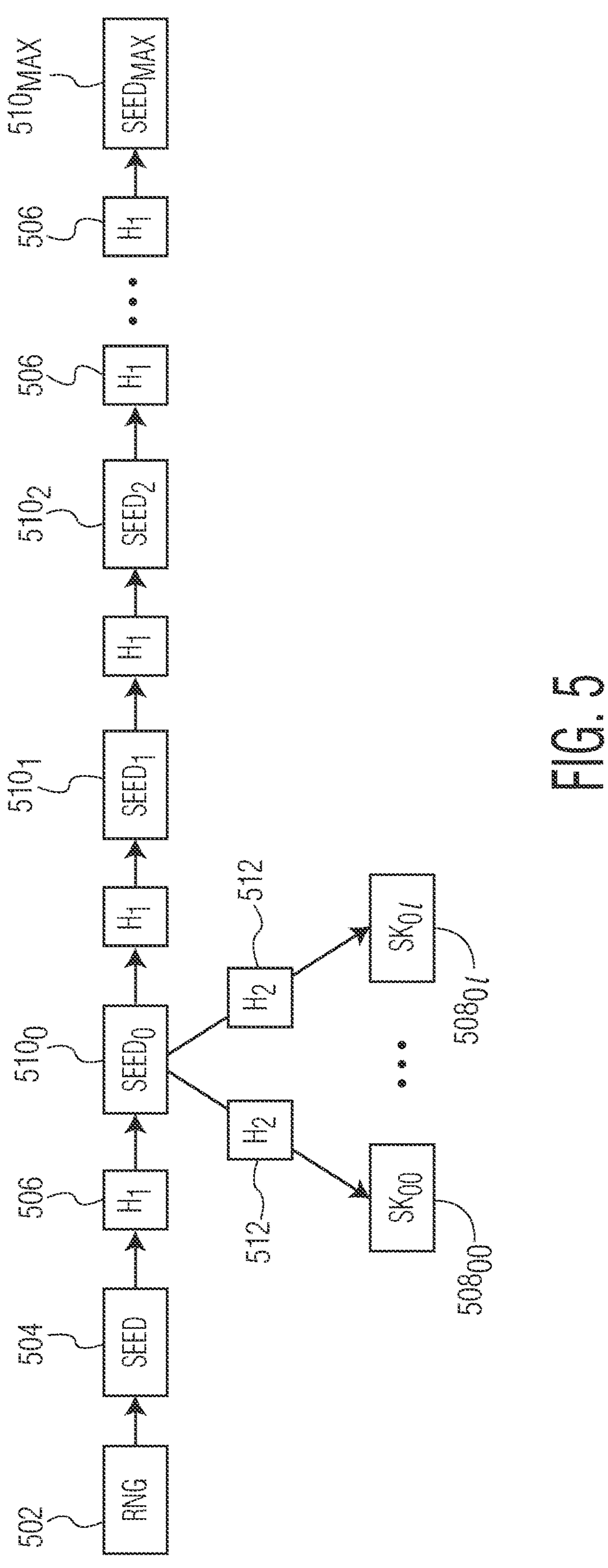
FIG. 5 illustrates the key derivation found in Huelsing.

FIG. 5 illustrates the key derivation found in Huelsing. A RNG 502 generates SEED 504. Huelsing suggested that instead of deriving the secret key element $SK_{q,i}$ directly (or in two steps) from the secret SEED 504, to instead replace the SEED after every signature with its hash/PRF applied to itself using a hash function 506. This essentially replaces SEED 205 with a chain of $2^h$ seeds $\mathrm{SEED}_q$ 510$_q$. Then the seeds $\mathrm{SEED}_q$ 510$_i$ are used along with hash function 512 to produce the secret key elements $SK_{q,i}$ 508.

Such a construction is forward secure and gives an SCA attacker only one distinct trace per seed $\mathrm{SEED}_q$ 510$_q$. A simple look at this approach shows no downsides; from the seed $\mathrm{SEED}_{q-1}$, it still requires $\ell+1$ hashes to derive $SK_q$. However, as discussed above, an LMS or XMSS signature also requires the computation of an authentication path. There are different cases that may be distinguished. In the first case, a lot of storage is available, enough to store the entire Merkle tree. In this case, this method works fine. In the second case, there is almost no storage, and the authentication path has to be computed from scratch every time. In this case, either this method cannot be used, because seeds $\mathrm{SEED}_j$, j<q are needed to compute signature q and due to the replacement of the seed SEED with $\mathrm{SEED}_q$, and because of the one-way property of the PRF/hash, the authentication path can no longer be computed, or the initial SEED always needs to be stored that reduces or destroys the forward secrecy property. In the third case, there is limited storage for a key scheduling algorithm. Therefore the backtracking issue is addressed as described above by storing the right nodes (one per layer of the tree). But the chain has to be traversed forward multiple times.

In this third case for instance, it may occur that for signature $q=2^{h-1}$, $2^{h-1}-1$ hashes/PRFs have to be computed to derive the necessary keys. Compared to the previous methods, this is an overhead of at least $2^{h-2}$. Additionally, this means that seeds $\mathrm{SEED}_q$ are still processed multiple times, namely once every time a future node has to be computed. Depending on the strategy, this can happen between h and $2^{h-1}$ times.

Embodiments of a key derivation process use three techniques and/or changes compared to previous key derivation methods that provide different advantages or trade-offs compared to previous techniques. They can be used together to get the advantages of all, or separately if one of the techniques is undesirable or not needed for some reason.

The first technique includes varying the chain-lengths to reduce the overhead of the key derivation by taking a trade-off over the forward secrecy and performance. A simple one-step idea is first described, and then the technique is generalized.

The second technique includes computing the $SK_{q,i}$ in a chain instead of all from the same SEED (because the $SK_{q,i}$ are always used jointly). This increases the SCA resistance because it limits how many times the same seed is used.

The third technique randomizes the index with which the intermediate seeds $SEED_q$ and OTS subkeys $S_{i,j}$ are computed making side-channel attacks more difficult.

Figure 6:
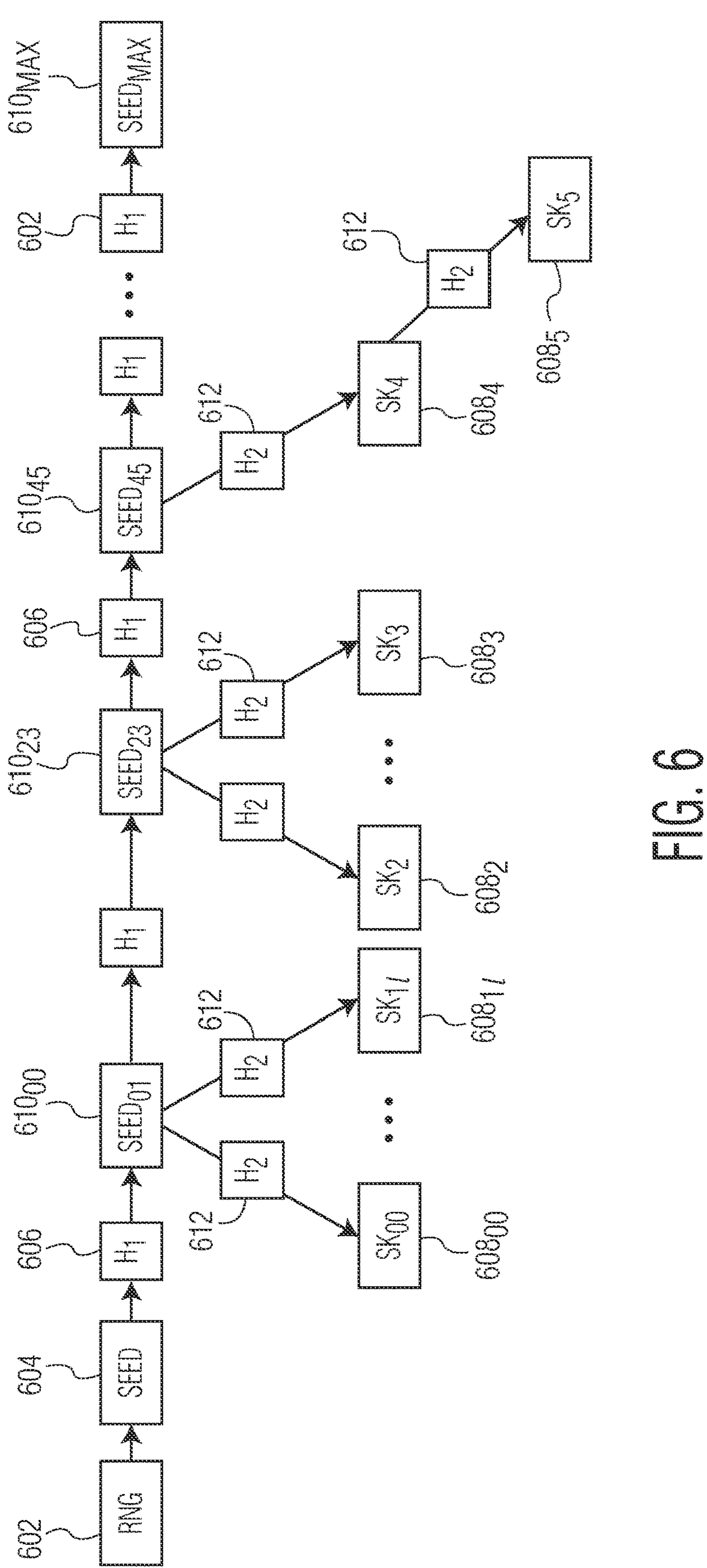
FIG. 6 illustrates a key derivation process with varying chain lengths.

FIG. 6 illustrates a key derivation process with varying chain lengths. The key derivation process of FIG. 6 halves the chain of seeds $SEED_q$ suggested by Huelsing and adds a layer below it. The RNG 602 produces initial SEED 604. The hash function 606 is applied to the SEED 60 to produce $SEED_{01}$ $\mathbf{610}_{01}$. The hash function 606 is then applied to $SEED_{01}$ $\mathbf{610}_{01}$ to produce $SEED_{23}$ $\mathbf{610}_{23}$. This then repeats as many times as needed. Each seed in the chain $SEED_{2i,2i+1}$ $\mathbf{610}_{2i,2i+1}$ is now utilized for the further derivation of the seeds for the keys 2i and 2i+1. This can either be performed sequentially (as is shown for seed $SEED_{01}$ and $SEED_{23}$), or a chain (as is shown for seed $SEED_{45}$). This seed may be used to derive OTS subkeys $SK_{q,i}$ $\mathbf{608}_{q,i}$ directly as is done in LMS (as is shown for $SEED_{01}$) or first deriving OTS keys (as is shown for $SEED_{23}$ and $SEED_{45}$). In the latter case, i.e., $SEED_{45}$, this can be combined with the second improvement of producing the secret keys in a chain as discussed below.

Compared to the method of Huelsing, this allows for faster forward computation and reducing the maximum number of hashes that need to be computed forward by half. This is done at the expense of full forward secrecy (but still limited forward secrecy protection), because the previous key may still be derived. For LMS/XMSS this may be useful because node 2i is in the authentication path of node 2i+1 (and vice versa).

It is noted that the faster computation is most effective, if only the SEED is stored for future computations. If instead the replacement method is used, as was the case in FIG. 5, the improvement is less strong. This is because for an OTS key this technique makes traversing the chain faster compared to the full-chain one.

Figure 7:
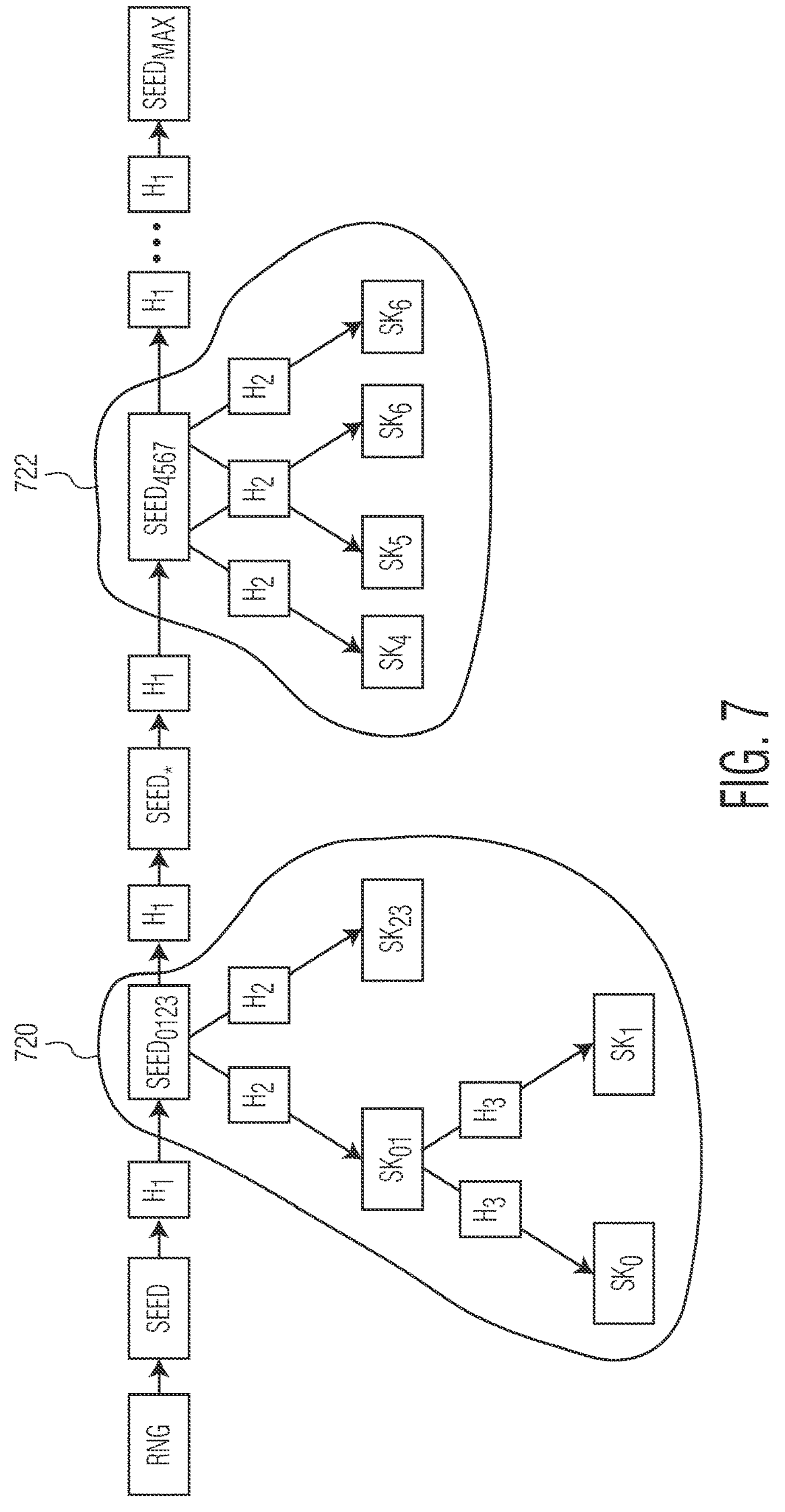
FIG. 7 illustrates the use of a tree-like structure and a fully sequential structure in the key derivation process.

This approach may be generalized by reducing the chain to length $2^h/2^r$. In this case, each of the $2^h/2^r$ seeds $SEED_{2i,2i+1,\ldots,2i+2^r-1}$ are used to generate the seeds for the OTS keys 2i through $2i+2^r-1$. The parameter r may be chosen to fit the use case. From a specific seed, the sequential derivation strategy can be split into a tree-like structure like a binary tree or be fully sequential by chaining the computation of the secret keys. FIG. 7 illustrates the use of a tree-like structure and a fully sequential structure in the key derivation process. For example, section 720 illustrates the use of a tree-like structure. Section 722 illustrates the use of a sequential structure. Other combinations are possible, i.e., the chain as in FIG. 6 may also be applied here.

This method allows for even faster forward computation and reducing the maximum number of hashes that need to be computed forward by another factor (depending on the exact strategy). This is accomplished at the expense of full forward secrecy (but still limited forward secrecy protection), and the previous keys may still be derived. This can again help with the authentication path computation. In addition, this approach provides better side-channel properties than the completely unrolled approach of FIG. 4A, as the number of distinct side-channel observations per SEED can be configured.

Figure 8A:
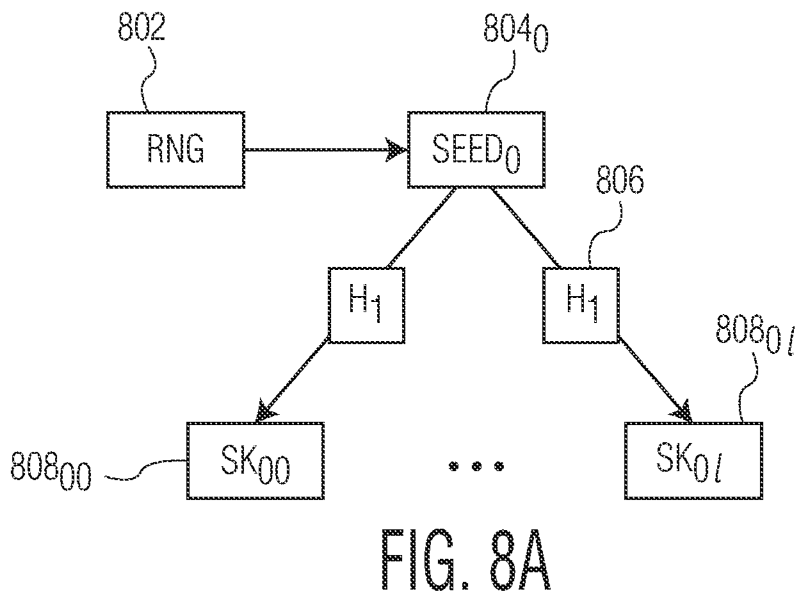
FIG. 8A illustrates a key derivation process using parallel processing for OTS subkeys.
Figure 8B:
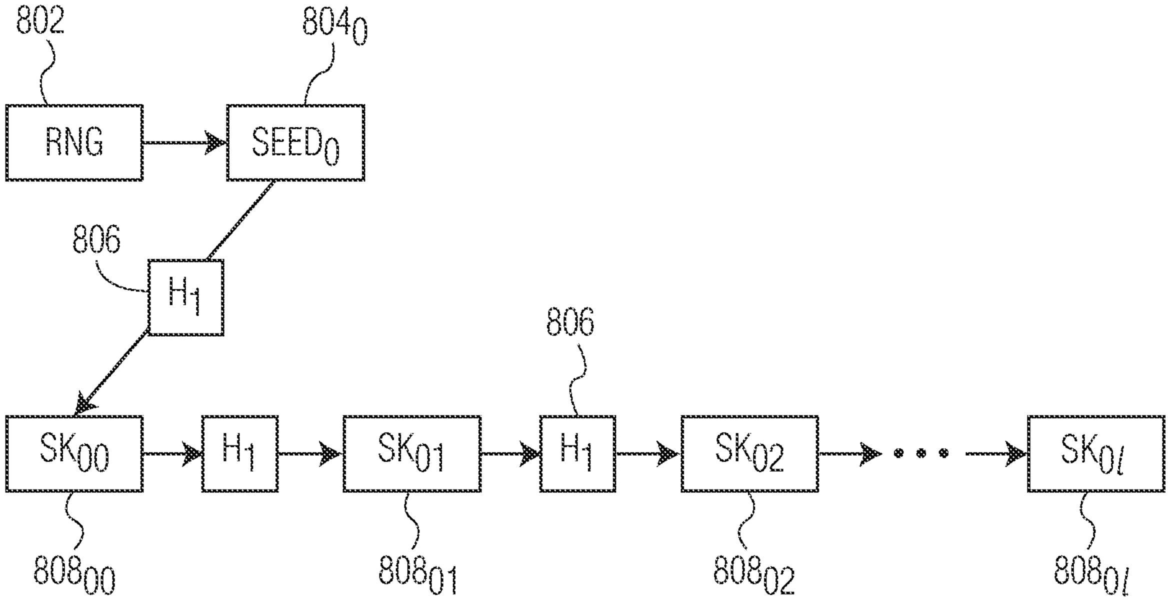
FIG. 8B illustrates a sequential key derivation process using chains for OTS subkeys.

FIG. 8A illustrates a key derivation process using parallel processing for OTS subkeys. When chain keys $SK_{q,i}$ $\mathbf{808}_{q,i}$ are derived from a seed $SEED_q$ $\mathbf{804}_q$ in a parallel manner, as was the case in LMS and XMSS, then $SEED_q$ is processed $\ell$ times by a hash function 806, which gives an SCA attacker multiple points of interest or observations on a trace. FIG. 8B illustrates a sequential key derivation process using chains for OTS subkeys. This approach instead derives the chain keys $SK_{q,i}$ $\mathbf{808}_{q,i}$ from $SEED_q$ $\mathbf{804}_q$ in a sequential manner as shown in FIG. 8B.

It may be observed that the same number of hash operations are necessary for both options. However, the key derivation using chains for OTS subkeys entails that only one observation per trace can be acquired for SEED, to perform an SCA to recover it. The only expense is that the computation is no longer parallelizable. This may easily be combined with the techniques described above.

The third technique is now described that randomizes the index with which the intermediate seeds $SEED_q$ and OTS subkeys $S_{i,j}$ are computed. This may be done for example by blinding or randomizing indices for the seeds and the OTS subkeys. First, recall that LMS subkeys are derived according to:

$$SK_{q,i} = H(I \| q \| i \| const \| \mathrm{SEED}),$$

and that XMSS subkeys are derived according to:

$$\mathrm{SEED}_q = PRF(\mathrm{SEED}, toByte(q, 32)),$$

$$SK_{q,i} = PRF(\mathrm{SEED}_q, toByte(i, 32)).$$

For LMS, I and const are constant values, which means that they do not help a Differential Power Analysis (DPA) attack but could enable a Simple Power Analysis (SPA). For both LMS and XMSS q corresponds to the index of the signature or to the state, which increases with every signature and i corresponds to the index of the OTS subkey. One of the previously mentioned techniques can help to alleviate the fact that the same seed is used along with numerous different values for q.

SCA resistance may be increased by blinding and/or randomizing the indices i and q such that an attacker loses knowledge of the inputs to the PRF and hence cannot easily perform DPA. This can be achieved by different means such as for example the following.

The known index may be added to or multiplied by a random value r. The random value r may be generated during key generation and stored together with the secret key. This approach is lightweight in computation and storage. However, the attacker could perform a DPA on r using knowledge of the incrementing indices.

If storage is available, a set of multiple random values may be stored and used according to a specific order/scheme to reduce the number of side-channel observations for each random value with known values.

One edge case is to store a fresh random value for each required index value. In this way, no function with known inputs is executed thereby thwarting most types of DPA and potentially SPA. However, this requires even more storage. So an alternative instantiation is to use a PRF on a secret random seed to derive random values. To achieve the highest side-channel protection, this PRF may be instantiated with a leakage-resilient PRF.

Because this key derivation is only performed to derive the secret keys on the signer's side, the verifier does not require any knowledge of the randomizing values. This means that the same technique described above may be applied to all other values input to the PRF including: I, q and const to make even SPA attacks more difficult.

Sphincs+ is a stateless signature scheme that will be standardized in the next 2 years. Whereas for LMS and XMSS pseudo-random key generation from a SEED as described in this disclosure is an option, for Sphincs+, due to the size of the secret key, it is mandatory. Because the Sphincs+ works by (pseudo-) randomizing the leaf with which a message is signed, the varying chain length option does not apply to the secret-key derivation of Sphincs+ for message signing. However the other two techniques might be applied to Sphincs+ as well.

Where the techniques described in this disclosure are additionally advantageous for Sphincs+ is in the top-most XMSS tree. In Sphincs+, a tree of XMSS trees is built. Each XMSS tree is generated on-the-fly with a SEEDxMss derived from the Sphincs+ SEED. The top-most XMSS trees in this structure are generated for almost every signing, and therefore the most attractive target for an adversary. The techniques described herein may protect this seed from attacks as well.

Figure 9:
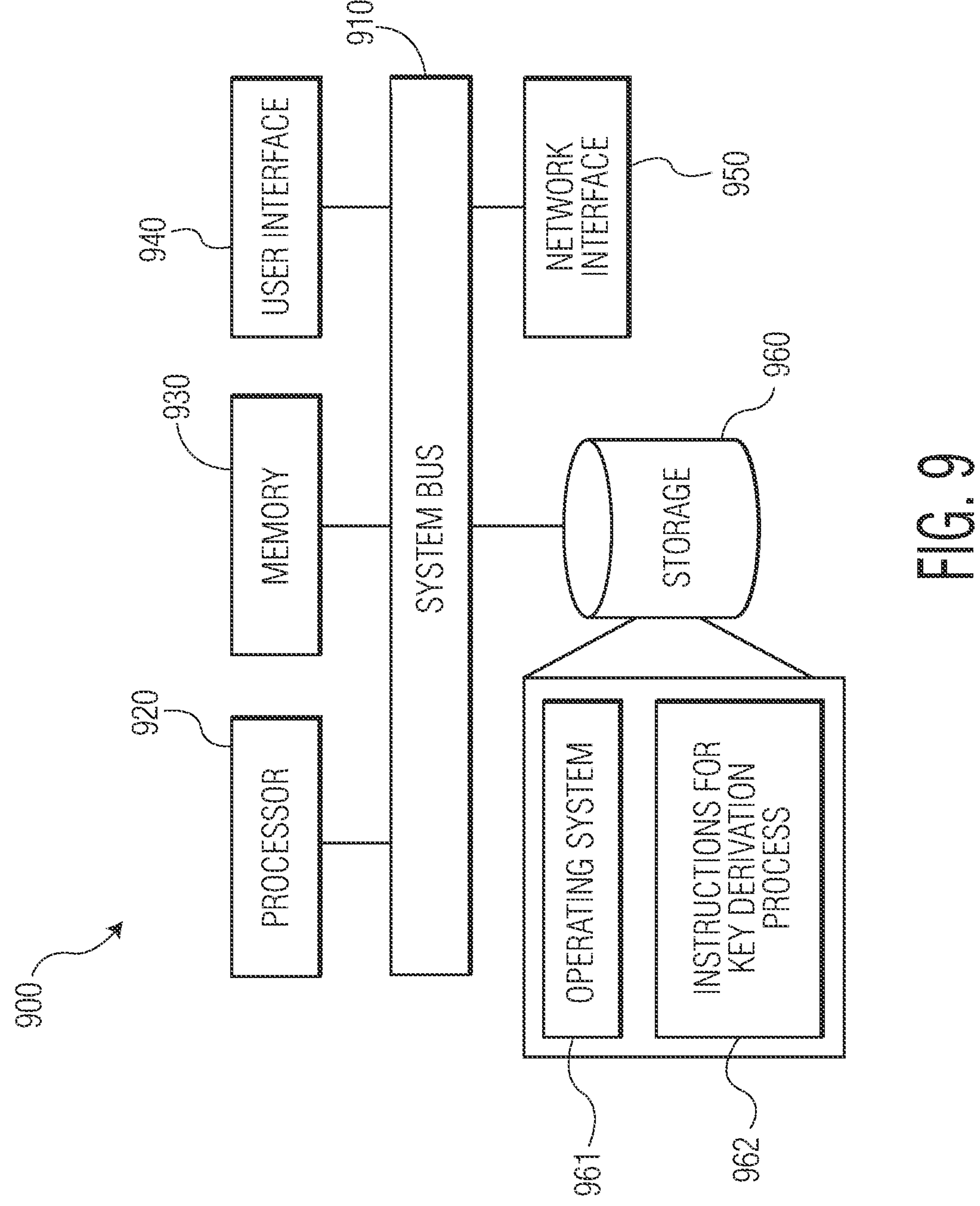
FIG. 9 illustrates an exemplary hardware diagram for implementing a key derivation process as described above.

FIG. 9 illustrates an exemplary hardware diagram 900 for implementing a key derivation process as described above. As shown, the device 900 includes a processor 920, memory 930, user interface 940, network interface 950, and storage 960 interconnected via one or more system buses 910. It will be understood that FIG. 9 constitutes, in some respects, an abstraction and that the actual organization of the components of the device 900 may be more complex than illustrated.

The processor 920 may be any hardware device capable of executing instructions stored in memory 930 or storage 960 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 930 may include various memories such as, for example L1, L2, or L3 cache or system memory. As such, the memory 930 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 940 may include one or more devices for enabling communication with a user. For example, the user interface 940 may include a display, a touch interface, a mouse, and/or a keyboard for receiving user commands. In some embodiments, the user interface 940 may include a command line interface or graphical user interface that may be presented to a remote terminal via the network interface 950.

The network interface 950 may include one or more devices for enabling communication with other hardware devices. For example, the network interface 950 may include a network interface card (NIC) configured to communicate according to the Ethernet protocol or other communications protocols, including wireless protocols. Additionally, the network interface 950 may implement a TCP/IP stack for communication according to the TCP/IP protocols. Various alternative or additional hardware or configurations for the network interface 950 will be apparent.

The storage 960 may include one or more machine-readable storage media such as read-only memory (ROM), random-access memory (RAM), magnetic disk storage media, optical storage media, flash-memory devices, or similar storage media. In various embodiments, the storage 960 may store instructions for execution by the processor 920 or data upon with the processor 920 may operate. For example, the storage 960 may store a base operating system 961 for controlling various basic operations of the hardware 900. The storage may also include instructions 962 for carrying out the key derivation processes described above.

It will be apparent that various information described as stored in the storage 960 may be additionally or alternatively stored in the memory 930. In this respect, the memory 930 may also be considered to constitute a "storage device" and the storage 960 may be considered a "memory." Various other arrangements will be apparent. Further, the memory 930 and storage 960 may both be considered to be "non-transitory machine-readable media." As used herein, the term "non-transitory" will be understood to exclude transitory signals but to include all forms of storage, including both volatile and non-volatile memories.

The system bus 910 allows communication between the processor 920, memory 930, user interface 940, storage 960, and network interface 950.

While the host device 900 is shown as including one of each described component, the various components may be duplicated in various embodiments. For example, the processor 920 may include multiple microprocessors that are configured to independently execute the methods described herein or are configured to perform steps or subroutines of the methods described herein such that the multiple processors cooperate to achieve the functionality described herein.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A data processing system comprising instructions embodied in a non-transitory computer readable medium, the instructions for generating keys in a hash based signature system in a processor, the instructions, when executed, cause the processor to perform a method comprising:

generating, by a random number generator, a seed;

hashing the seed with a first hash function to produce an intermediate seed;

iteratively hashing the intermediate seed and subsequent hashed values sequentially in a chain to produce n/k chained seeds, wherein n is a total number of secret keys generated and k is a number of secret keys generated from each chained seed;

repeatedly hashing the n/k chained seeds to generate k secret keys from each of the n/k chained seeds using a second hash function, wherein at least one the k secret keys is generated from another of the k secret keys in a sequential chain; and generating a cipher text using one or more of the k secret keys.

2. The data processing system of claim 1, generating k secret keys includes generating the secret keys using a tree structure with r levels wherein $k=2^r$.

3. The data processing system of claim 1, generating k secret keys includes sequentially generating the secret keys in a chain using the second hash function.

4. The data processing system of claim 1, wherein a random value r is applied to indices used in computing one of the first hash function and the second hash function.

5. The data processing system of claim 1, wherein two different random values $r_1$ and $r_2$ are applied to the indices used in computing one of the first hash function and the second hash function.

6. The data processing system of claim 1, wherein the hash based signature system uses one of an extended Merkle Signature Scheme (XMSS), a Leighton-Micali Signature (LMS), and a Sphincs+ signature scheme.

7. A data processing system comprising a processor and instructions embodied in a non-transitory computer readable medium, the instructions, when executed, cause the processor to perform a method for generating keys in a hash based signature system, the method comprising:

generating, by a random number generator, a seed; and hashing the first seed using a first hash function to produce a first intermediate value;

iteratively hashing the first intermediate value and subsequent intermediate values sequentially in a chain to produce a plurality of secret keys; and generating a cipher text using one or more of the plurality of secret keys.

8. The data processing system of claim 7, further comprising:

repeatedly hashing the seed sequentially with the first hash function to produce a plurality of chained seeds; and generating a plurality of secret keys sequentially in a chain for each of the plurality of chained seeds by repeatedly applying a second hash function to each of the plurality of chained seeds.

9. The data processing system of claim 7, wherein a random value r is applied to indices used in computing one of the first hash function.

10. The data processing system of claim 7, wherein two different random values $r_1$ and $r_2$ are applied to the indices used in computing one of the first hash function and the second hash function.

11. The data processing system of claim 7, wherein the hash based signature system uses one of an extended Merkle Signature Scheme (XMSS), a Leighton-Micali Signature (LMS), and a Sphincs+ signature scheme.

12. A data processing system comprising a processor and instructions embodied in a non-transitory computer readable medium, the instructions, when executed, cause the processor to perform a method for generating keys in a hash based signature system, the method comprising:

generating, by a random number generator, a seed;

generating a first random value $r_1$;

hashing the seed with a first hash function to produce an intermediate seed;

generating a first plurality of secret keys using a first hash function based upon the intermediate seed and by applying the first random value $r_1$ to at least one parameter input into the first hash function;

repeatedly hashing the intermediate seed sequentially with the first hash function to produce a plurality of chained seeds;

generating a plurality of secret keys for each of the plurality of chained seeds by repeatedly applying a second hash function to each of the plurality of chained seeds; and generating a cipher text using one or more of the plurality of secret keys.

13. The data processing system of claim 12, wherein the plurality of secret keys is generated sequentially in a chain for each of the plurality of chained seeds by repeatedly applying a second hash function to each of the plurality of chained seeds.

14. The data processing system of claim 12, wherein the plurality of secret keys is generated in a tree structure for each of the plurality of chained seeds.

15. The data processing system of claim 12, wherein the hash based signature system uses one of an extended Merkle Signature Scheme (XMSS), a Leighton-Micali Signature (LMS)), and a Sphincs+ signature scheme.

16. The data processing system of claim 12, further comprising:

generating a second random value $r_2$; and generating a second plurality of secret keys using the first hash function based upon the seed and by applying the second random value $r_2$ to at least one parameter input into the first hash function.

17. The data processing system of claim 16, generating a first and second plurality of secret keys includes:

repeatedly hashing the seed sequentially with the first hash function to produce a plurality of chained seeds; and generating the first and second plurality of secret keys for each of the plurality of chained seeds by repeatedly applying the first hash function to each of the plurality of chained seeds.

18. The data processing system of claim 17, wherein the first plurality of secret keys is generated sequentially in a chain for each of the plurality of chained seeds by repeatedly applying the first hash function to each of the plurality of chained seeds, and the second plurality of secret keys are generated sequentially in a chain for each of the plurality of chained seeds by repeatedly applying the first hash function to each of the plurality of chained seeds.

19. The data processing system of claim 17, wherein the plurality of first and second secret keys are generated in a tree structure for each of the plurality of chained seeds.

* * * * *